United States Patent
Easter et al.

(10) Patent No.: US 12,074,326 B2
(45) Date of Patent: Aug. 27, 2024

(54) ELECTRICALLY CONDUCTIVE COMPOSITE MATERIAL AND METHOD

(71) Applicant: Dynamic Material Systems LLC, Oviedo, FL (US)

(72) Inventors: William Easter, Chuluota, FL (US); Walter Sherwood, Ballston Lake, NY (US); Arnold Hill, Orlando, FL (US); Gordon Nameni, Menomonee, WI (US)

(73) Assignee: Dynamic Material Systems LLC, Oviedo, FL (US)

( * ) Notice: Subject to any disclaimer, the term of this patent is extended or adjusted under 35 U.S.C. 154(b) by 405 days.

(21) Appl. No.: 17/260,768

(22) PCT Filed: Jul. 19, 2019

(86) PCT No.: PCT/US2019/042664
§ 371 (c)(1),
(2) Date: Jan. 15, 2021

(87) PCT Pub. No.: WO2020/018945
PCT Pub. Date: Jan. 23, 2020

(65) Prior Publication Data
US 2021/0296652 A1    Sep. 23, 2021

Related U.S. Application Data

(60) Provisional application No. 62/700,636, filed on Jul. 19, 2018.

(51) Int. Cl.
| | |
|---|---|
| *H01M 4/04* | (2006.01) |
| *C04B 35/571* | (2006.01) |
| *C04B 35/64* | (2006.01) |
| *H01G 11/38* | (2013.01) |
| *H01G 11/44* | (2013.01) |
| *H01G 11/86* | (2013.01) |
| *H01M 4/1393* | (2010.01) |
| *H01M 4/587* | (2010.01) |
| *H01M 4/62* | (2006.01) |
| *H01M 10/0525* | (2010.01) |

(52) U.S. Cl.
CPC .......... *H01M 4/624* (2013.01); *C04B 35/571* (2013.01); *C04B 35/64* (2013.01); *H01G 11/38* (2013.01); *H01G 11/44* (2013.01); *H01G 11/86* (2013.01); *H01M 4/0402* (2013.01); *H01M 4/0471* (2013.01); *H01M 4/1393* (2013.01); *H01M 4/587* (2013.01); *H01M 10/0525* (2013.01); *C04B 2235/3895* (2013.01); *C04B 2235/483* (2013.01)

(58) Field of Classification Search
None
See application file for complete search history.

(56) References Cited

U.S. PATENT DOCUMENTS

| | | | |
|---|---|---|---|
| 5,907,899 A | 6/1999 | Dahn et al. | |
| 2005/0276961 A1 | 12/2005 | Sherwood et al. | |
| 2013/0022870 A1* | 1/2013 | Choi | H01M 4/366 429/219 |
| 2015/0214548 A1* | 7/2015 | Ohno | H01M 4/364 252/510 |
| 2017/0320744 A1* | 11/2017 | Haon | H01M 4/136 |
| 2019/0363353 A1* | 11/2019 | Yamada | H01M 4/386 |

FOREIGN PATENT DOCUMENTS

WO    2018081484 A1    5/2018

OTHER PUBLICATIONS

Zang et al. "Upgrading carbonaceous materials: Coal, tar, pitch and beyond" (2022).*
Bhandavat et al., Stable and Efficient Li-ion Battery Anodes Prepared from Polymer-Derived Silicon Oxycarbide-Carbon Nanotube Shell/Core Composites, Journal of Physical Chemistry C, vol. 117, May 31, 2013, p. 11899-11805.
Lamuel David et al., Silicon oxycarbide glass-graphene composite paper electrode for long-cycle lithium-ion batteries, Nature Communications, article published Mar. 30, 2016, p. 1-10.

* cited by examiner

*Primary Examiner* — Austin Murata
(74) *Attorney, Agent, or Firm* — Christopher Paradies; Paradies Law P.A.

(57) ABSTRACT

PDC resins are mixed with various sources of carbon to form electrodes through pyrolysis of the mixture of PDC resins and coal dust derived materials with or without other sources of carbon, substrates and the like. For example, a PDC resin—coal dust mixture produces a material for use as an anode in lithium ion batteries and supercapacitors when pyrolyzed to form a porous, electrically conductive ceramic composite.

21 Claims, 4 Drawing Sheets

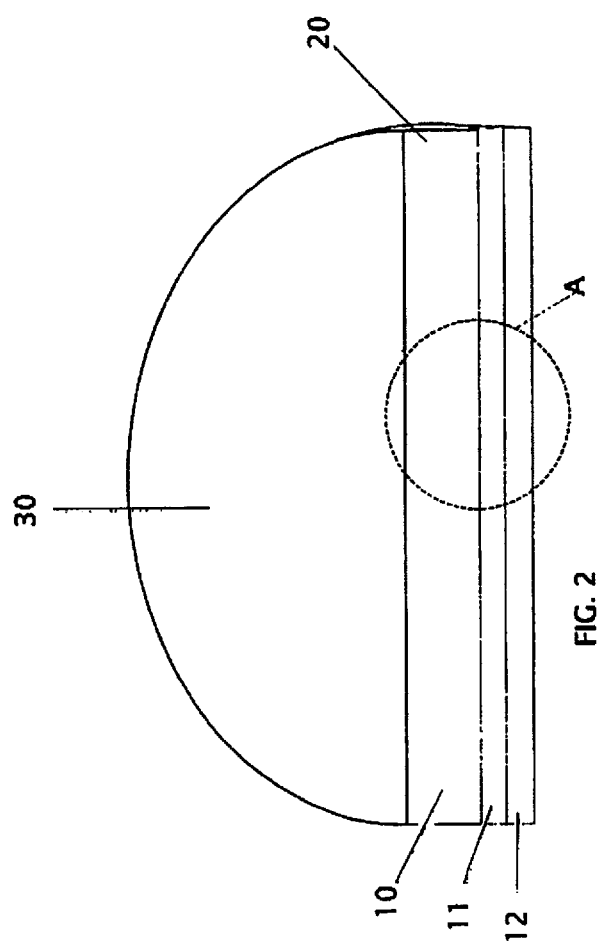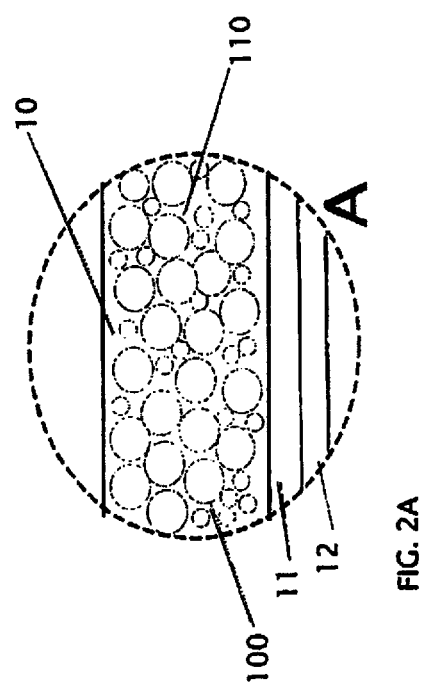

ELECTRICALLY CONDUCTIVE COMPOSITE MATERIAL AND METHOD

CROSS RELATED APPLICATIONS

This application is a 371 U.S. national phase application which claims priority to PCT/US2019/042664 filed Jul. 19, 2019 which claims priority to U.S. Provisional Appl. No. 62/700,636 filed on Jul. 19, 2018, the entirety of which is hereby incorporated by reference.

FIELD OF THE INVENTION

The field relates to electrodes for energy storage devices, especially lithium ion batteries and capacitors.

BACKGROUND

A battery with a higher energy density and power density is needed to store electric energy for use when needed. There has been a dedicated effort to develop such batteries over several decades and advances have been made. Still energy storage devices fall short of replacing liquid fuels and hydrocarbons. One of the most accepted battery technologies is the lithium ion battery, and the most common lithium ion batteries are made with a graphite anode, lithium electrolytes, and a cathode which contains Li, such as LCO, LMO, NMC, LFP or NCA.

Graphite is used as a anode for some lithium ion batteries. Graphite provides acceptable electrochemical performance at lower cost than some competing materials. Graphite has a comparatively low volume expansion during charging and discharging compared to some other materials, and Graphite is abundantly available. The theoretical specific capacity of graphite is 372 mAh/g. Graphite electrodes (anodes in Li batteries) are known to be of moderate cost but suffer from only a moderate lifetime. Longer lifetimes are achieved using $Li_4Ti_5O_{12}$ (LTO), for example; however, LTO electrodes cost much more and have a theoretical specific capacity of about 175 mAh/g, which is less than the theoretical specific gravity of Graphite.

These tradeoffs have driven continued research for better anodes. There has been much research into silicon anodes or electrodes due to greater theoretical density (e.g. 4200 mAh/g) or the addition of silicon to the anodes to improve lithiation. By adding silicon to Graphite or other materials it has been hoped that specific capacity of the anode could be increased. However, silicon expands and contracts during repeated charge and discharge cycles, as much as 300%, and battery lifetime (in cycles) is diminished unacceptably. Continued research to solve the expansion problem has been futile.

For example, a silicon oxycarbide glass-graphene composite paper electrode was prepared that achieved sufficiently long lifetime (1,020 cycles) at a mass loading of 2 milligram per square centimeter providing an electrode capacity of 588 milliAmp hour/gram. However, this anode degrades over time comparatively rapidly.

Silicon has received attention as a possible alternative to graphitic carbon, but it has significant disadvantages that remain to be overcome. A 320% crystoallographic expansion upon lithiation causes cracking, isolation and delamination issues, for example. In addition, stability issues remain, which affect cycling efficiency. The successful use of silicon and silicon composites have many challenges remaining, as stated in the first quarter progress report dated 2018 and entitled "Next Generation Anodes for Lithium-ion Batteries".

A new material provides an anode with optimal properties solving the known issues with previously known anodes and anode processing techniques.

SUMMARY

An electrode of an energy storage device comprises a polymer derived ceramic coal dust composite. For example, the electrode may be used as an anode of a lithium ion battery or an electrode for a supercapacitor. The electrode may be used as an anode for a lithium ion battery, for example. In one example, the coal dust is processed to form a coal core composite in a reaction between a silicon oxy carbide (SiOC) resin system and fine coal dust particles during pyrolysis of a mixture of the SiOC resin and coal dust. The carbon in the coal dust reacts with and/or becomes intermingled within the SiOC resin, such that the coal core composite is resistant to flame. Herein, resistant to flame means that a material does not ignite when exposed to the flame of a Bunsen burner for five minutes. In contrast coal dust particles are readily ignited upon exposure to a Bunsen burner flame.

Since PDC resin derived ceramics, such as SiOC ceramics, are not inherently electrically conductive, absent coal dust, it is surprising and unexpected that a matrix of the material could become a better electrode than graphite or other materials, when combined with coal dust.

Coal dust, when mixed with and pyrolyzed together with the SiOC, renders the combined material electrically conductive and the properties of the combination synergistically combines to outperform graphite in some key respects. Industrial applications for this new class of materials includes electrical applications such as static charge dissipation and as battery/supercapacitor electrodes, for example.

In one example, a 50 wt % SiOC—50 wt % fine coal powder composite was formed by mixing the component parts together and forming the mixture into an electrode. The electrode may be pressed in a press and may be pyrolyzed in a non-oxidizing atmosphere at 800 degrees centigrade or more. Electrode exhibit surprising and unexpected properties when used as an anode for a lithium ion battery half-cell.

In one example, the electrode is a Polymer-Derived Ceramic (PDC) composite. For example, one of a variety of polymer precursor resins may be mixed with coal dust, and optionally other carbon-based fillers, for example. However, it is thought that the coal dust that has been processed at temperature less than 400 degrees centigrade, or alternatively less than 200 degrees centigrade, provides more than just carbon and is preferable to graphite or pyrolyzed coal dust, which does not perform as well.

The mixture may be pyrolyzed in a non-oxidizing atmosphere at a pyrolysis temperature above 400 degrees centigrade, preferably at least 800 degrees centigrade. For example, forming an anode for lithium ion battery provides an anode that has surprising and unexpected properties.

More preferably, the PDC composite is heated to 800 degrees centigrade or greater, chemically reacting at least a portion of the carbon dust with a PDC resin to form an electrically conductive composite ceramic anode. In one example, a resulting anode made from a PDC—coal dust composite exhibited three times the specific capacity of current graphite anodes when pyrolyzed at 800 degrees centigrade or greater, which is a very surprising and unexpected result. It is thought that the cost/performance of PDC—coal dust derived, electrically conductive ceramic anodes made according to this method are unmatched by any known anodes for lithium ion batteries.

Polymer derived ceramic (PDC) precursors may be selected from resins that produce ceramic materials when heated to high temperatures. For example, a SiOC resin may be heated above 800° C. in air or in an inert gas, such as nitrogen or argon, and will form a ceramic part. Many ceramics are insulators and would not function as electrodes; however, PDC—coal dust ceramics are electrically conductive and may perform better than known graphite anodes. PDC precursor polymers may be selected from the following: siloxanes, silanes, carbosilanes, silazanes, silsesquioxane and combinations of these.

For example, during pyrolysis, a mixture of PDC precursor polymers and coal dust form a nanoporous, open-celled ceramic network in situ without the need of any additional blowing agent. For example, a nanoporous network formed in situ during pyrolysis of a PDC—coal dust ceramic may allow lithium ion transport/reaction within the electrically conductive ceramic matrix. Other battery systems, especially those that operate at higher temperatures may benefit even more from PDC-coal dust ceramic matrix composite electrodes. For example, properties of a PDC—coal dust ceramic matrix composite may be controlled by selection of the composition of the precursor polymer. The electrical properties of the PDC resin may be modified by the addition of coal dust to optimize performance for selected applications.

In one example, a PDC is selected to have a greater concentration of silicon and less carbon to improve specific capacity of a battery utilizing a nanoporous anode made of the pyrolyzed material. In another example, a greater concentration of carbon with less oxygen improves specific power for a capacitor utilizing a pyrolyzed anode. Additional elements and oxides of elements may be added into PDC precursor resins such as titanium, cobalt, manganese, aluminum or combinations. For example, a cathode may comprise one or more of these additional elements or their oxides.

It is thought, without being limiting in any way, that the unique open, disordered, porous and high strength structure of pyrolyzed PDC—coal dust ceramics are substantially better at resisting damage caused to other anodes by repeated rapid charge/discharge cycles that occur in energy storage devices.

BRIEF DESCRIPTION OF THE DRAWINGS

The following drawings are illustrative examples and do not further limit any claims that may eventually issue.

FIGS. 2-2a illustrate a schematic of a coin cell made from an anode material and (A) a detailed schematic view.

When the same reference characters are used, these labels refer to similar parts in the examples illustrated in the drawings.

DETAILED DESCRIPTION

Figure 1:
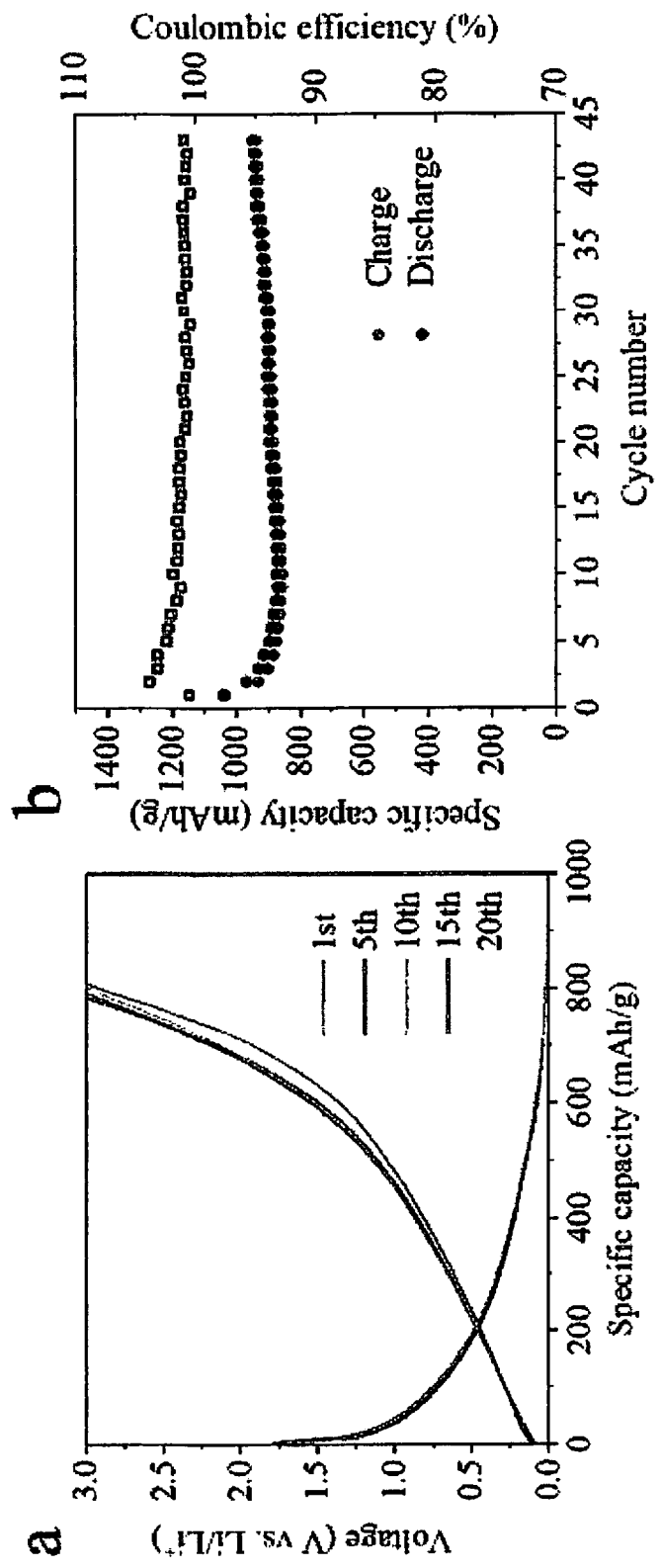
FIGS. 1a-1b illustrate surprising and unexpected results of testing of an example of an anode material.

In one example a PDC resin is selected from one, or a combination of, the following: (a) siloxane compositions comprising from 0% to 85% by mass carbon atoms; (b) siloxane and silsesquisiloxane compositions comprising 5% to 90% by mass silicon atoms; and 1% to 60% by mass oxygen atoms; (c) silane and/or carbosilane precursor compositions comprising 10% to 85% by mass carbon; 10% to 75% by mass silicon; and 0% to 50% by mass oxygen; (d) silazane precursor compositions comprising 0% to 85% by mass carbon; 5% to 90% by mass silicon; 0% to 70% by mass oxygen; and 10% to 50% nitrogen. These PDC precursors may be mixed with fillers to enhance conductivity, increase porosity/surface area, improve reactive efficiency and charge/discharge capability, for example.

In one example, a PDC precursor is selected with greater than 10% by mass carbon atoms. It is though, without being limiting in any way, that increasing carbon atoms in the PDC precursor may create "carbon-bridging" on a nanoscale. For example, carbon content may be provided using butadiene, dicyclopentadiene, divinyl benzene, phenyl groups, vinyl groups, propargyl groups, allyl groups, or ethynyl groups substituted on the main PDC precursor chain or mixed with the precursor prior to pyrolysis.

In one example, coal dust is mixed with the PDC precursor. For example, the mixture may comprise from 1% to 90% by mass of coal dust. In addition, the following may be mixed in with the PDC precursor: carbon nanotubes or nanofibers, less 60% by mass; graphene or graphene oxide, less than 60% by mass; carbon black, carbon powder, or graphite powder, less than 90% by mass; less than 70% by mass of conductive metal powder, metal nanopowders, metal nanofibers, or combinations of these, such as silicon, aluminum, titanium, nickel, zinc, cobalt, manganese, iron, or the associated oxides/carbides of these metals.

In one example, PDC precursor resin is mixed with less than 50% by mass of carbon-forming precursors such as furfural alcohol, phenolic resin, cresol, coal tar pitch, or other carbon sources.

In one example, powdered additives that are added (except for the nanotubes and graphene) are selected with sizes that range from 0.01 micrometer to 100 micrometers, more preferably from 0.1 micrometer to 5 micrometers.

In one example of a method for incorporating these materials in a battery or supercapacitor, following pyrolysis, the electrode material is powdered, formed into a slurry using a binder, such as a fugitive binder, and is deposited on an electrode, such as a metal electrode, layer. After heating, the electrode material becomes bonded to the electrode and may be further processed for use in a battery or supercapacitor. Alternatively, the electrode material is formed into a thin sheet that is bonded to a conductive sheet, such as a metallic sheet, by a conductive binder or adhesive. In yet another alternative, the electrode material is inserted without the need of any other material to form the electrode.

In one example, electrode materials may be further enhanced by post processing at elevated temperature in controlled atmospheres. For example, heating the pyrolyzed electrode materials in air or oxygen above 400° C. will reduce and/or alter the carbon in the electrode materials, especially carbon on the surface and in open pores of the material. This postprocessing may be used to reduce the carbon content and optimize the reactivity/conductivity of the material surfaces and pores. Also, heating pyrolyzed electrode material in a carburizing atmosphere, such as propene or natural gas, for a specified duration may be used to increase the amount of carbon disposed on surfaces and/or open pores of the electrode material. This may be used to increase electrical conductivity, for example. Heating of the pyrolyzed electrode materials in a reducing atmosphere, such as hydrogen or hydrogen gas mixtures comprising hydrogen and an inert gas, for example, may be utilized to modify the content of oxygen and/or carbon from the surface of the material and open pores. This may increase the reactivity of the surface and/or open pores, for example.

In one example, fugitive materials such as methacrylates or acrylics are introduced into the PDC precursor. It is thought, without being limiting in any way, that these fugitive materials will produce additional interconnected porosity as the fugitive material escapes as a gas and creates porosity during pyrolysis or pre-pyrolysis. This method may be used to increase surface area, pore size, the number of pores and/or interconnectivity between pores. It is though, without being limiting in any way, that fugitive materials may provide more reactive sites. For example, the pores and surface may be lined with carbon or carbon rich compositions that improve conductivity.

In one example, a SiOC precursor, with or without carbon dust, is formed into microbeads that are pyrolyzed into ceramic microbeads. The ceramic microbeads are mixed with a carbon former, such as phenolic resin. The result is a higher electrical conductivity of the microbead—carbon electrode material, with or without carbon dust in the microbeads, which surprisingly and unexpectedly achieves both conductivity and reactivity much greater than graphitic carbon without the drawbacks of other silicon anodes. It is thought, without being limiting in any way, that phenolic binder provides a carbon matrix mitigating the problems raised by other silicon and silicon-carbon composite electrodes. In one example, at least 10% carbon dust mixed into the SiOC precursor provides a cycling efficiency advantage and prevents cracking of the microbeads, for example.

In one example, photo-initiators are mixed with precursors and photoreactive functional groups, such as vinyl groups or allyl groups, are mixed with PDC precursors. The functional groups react with the PDC precursor chains to produce, for example, a UV curable PDC precursor. 3D printing of the UV curable PDC precursor allows any shape and size of electrodes to be produced by 3D printing and pyrolysis of the printed UV curable PDC precursor. For example, a sheet electrode of any length or width may be produced having a thickness of 25-100 microns thick using 3D printing and pyrolysis. In addition, more complex patterns may be printed.

In one example, a SiOC/Coal Powder Pyrolyzed Compostie Anode is prepared. For example, 50% coal particles and 50% SiOC pre-ceramic resin are combined by mixing to produce electrically conductive Ceramic-Coal Composite Electrode particles. These may be pyrolyzed in a non-oxidizing atmosphere and processed to form an electrode, as previously disclosed in this application. A sample of Ceramic-Coal Composite Electrode particles may be produced by adding 50 grams of coal dust, which was calcined and milled to a 5 micron dry powder, to 50 grams of PDC precursor resin, such as a SiOC precursor resin, which is catalyzed with 4 wt % platinum catalyst solution. In one example, 50 grams of acetone was mixed with the resin prior to mixing the resin with the coal dust, for example, and the mixture was mechanically stirred for 30 minutes to ensure that all of the coal powder particles became thoroughly coated with the acetone/resin solution. Acetone was removed by evaporation in vacuum for 30 minutes. The resulting resin coated coal powder was cured. For example, curing may proceed by spreading out a layer of the sample in a pan and heating to 120 degrees centigrade for 30 minutes. After curing the sample was pyrolyzed by heating in an inert nitrogen atmosphere within a furnace at 1000° C. for 8 hours. A ceramic-carbon composite is formed during pyrolysis. The ceramic-carbon composite forms clumps, and the clumps were milled for 24 hours in a ball mill, providing ceramic-carbon composite particles of about 10 microns.

Figure 3:
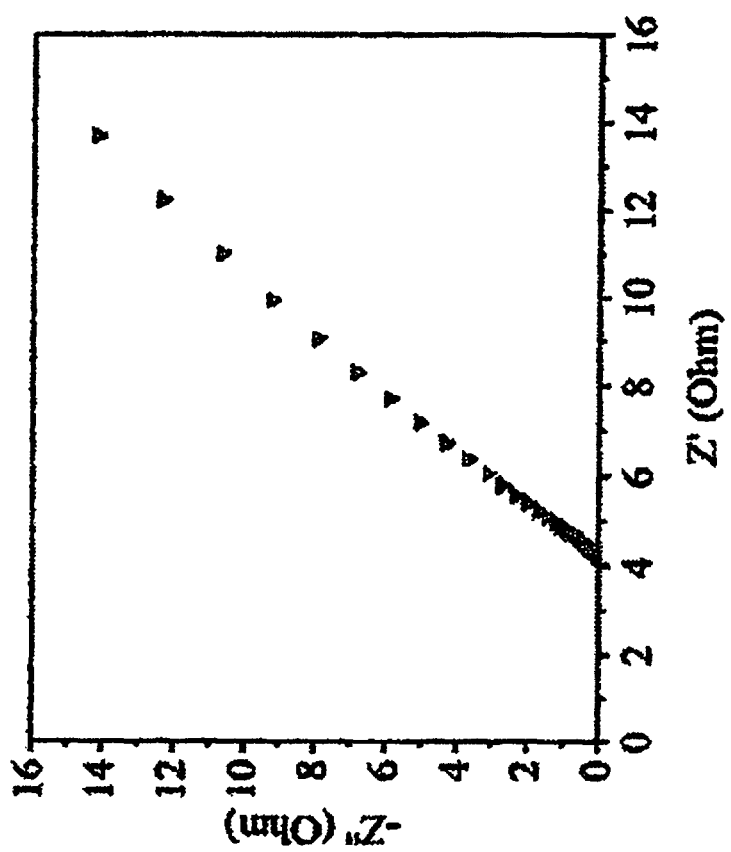
FIG. 3 illustrates additional test results for the same example of an anode material as the test results illustrated in FIGS. 1a-1b.
Figure 4A:
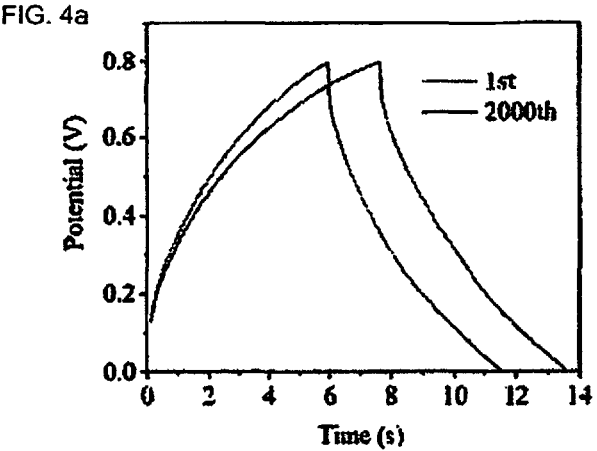
FIG. 4a-4c illustrate additional test results for the same example of an anode material as the results illustrated in FIGS. 1a-1b and 3.
Figure 4B:
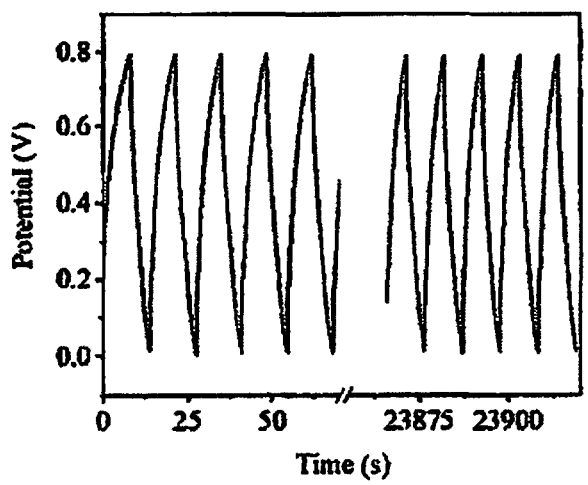
Figure 4C:
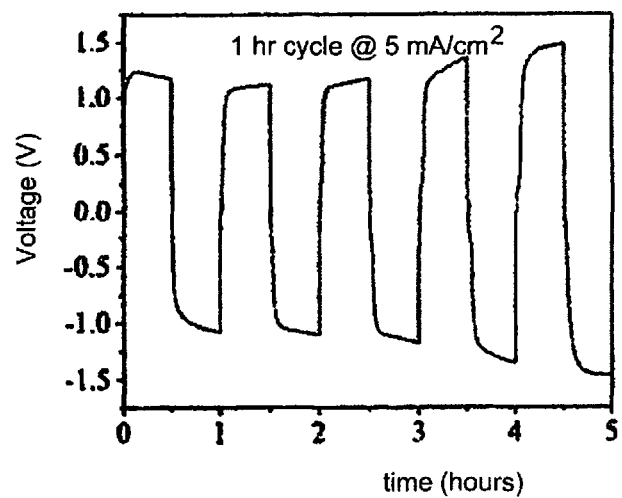

In one example, 10 micron ceramic-carbon composite particles were tested, as shown in FIGS. 1*a* and 1*b*, FIG. 3 and FIGS. 4*a*-4*c*, for example.

Surprisingly and unexpectedly, the results show that Coulombic efficiency is greater than 100% for more than 40 cycles, and the specific capacity in milliamp hours per gram is in a range from greater than 1000 to greater than 800 with an average of about 900 at 30 cycles. No energy loss is occurring as the coin cell charges and discharges. Surprisingly, after the first 5 cycles, the slope of the specific capacity is upward, which is very surprising. Usually, specific capacity decays during charging cycles for known materials. The theoretical best specific capacity for graphite is 372. The tested material has a much better specific capacity without the expected decay over repeated charge/discharge cycles.

For example, these ceramic-carbon composite particles may replace graphite and LTO particles. The particles may be processed using the same methods as for graphite particles, but with far superior results, for example.

In one example, the particles are processed to form a stand-alone electrode eliminating binders and graphite and other fillers. This simplifies processing without compromising cycle efficiency.

FIG. 2-2A schematically illustrates an example of a disk made of ceramic-carbon composite particles as used in a battery as an anode. The disk 10 in FIG. 2 is a coin anode for a coin cell with a side 20 and a top face 30 and is shown with a cross sectional area and detail A, which is schematically represented in FIG. 2A. FIG. 2A shows particles 100 and interstices 110, which are exaggerated size for illustration purposes. The anode 10 is separated from a cathode 12 by an electrolyte 11, for example. The interstices 110 may be porosity or may be partially filled with filler particles or a coating of carbon or the like, as previously disclosed in the application. In a Lithium ion battery, lithium ions pass through the interstices and into pores in the particles of the anode. In one example, a binder is used to bind the particles together that comprises a fugitive component that vaporized during heating and is removed from the interstices 110.

In another example, an anode powder material is comprised of a SiOC PDC resin and carbon nanotubes are mixed with the resin. For example, 10 grams of multiwall carbon nanotubes were mixed in a 200 milliliter flask with 50 grams of cresol and 100 grams of cyclohexane using a magnetic stirrer. The mixture was stirred overnight to soften and separate the clumped nanotubes. The mixture was sonicated for 30 minutes at a 50% duty cycle to further break up and isolate nanotubes from nanotube agglomerates resulting in a black liquid. A few, smaller clumps of nanotubes were still visible microscopically. The mixture was poured into 100 grams of vinyl siloxane and mixed for 10 minutes. A peroxide catalyst was added and the solvent was evaporated off by heating at 100 degrees centigrade for 1 hour, leaving a viscous black liquid. The liquid was poured into an aluminum tray and cured at 200° C. for 2 hours. A disk was formed that was somewhat brittle, and this disk was pyrolyzed at 1000° C. for 2 hours in nitrogen and was allowed to cool, forming a ceramic disk. The ceramic disk was broken up with a mortar and pestle, and the resulting coarse powder was ball milled for 24 hours to produce 0.5 micron to 10 micron powder.

In yet another example, an anode was 3D printed. For example, 20 grams of graphene platelets may be added to a 200 ml flask containing 50 grams of Cresol and 100 grams of cyclohexane. The mixture may be stirred overnight using a magnetic stirrer to intercalate the cresol/cyclohexane into the graphene. The mixture is sonicated for 30 minutes at a 50% duty cycle to separate the platelets. The resulting black liquid is added to a vinyl-phenyl siloxane containing a UV photo-initiator and mixed thoroughly, and the solvent is evaporated by heating in a vacuum for 1 hour at 80° C. The resulting black low viscosity liquid is mixed with a second photocatalyst and is poured into a resin tray of a KUDO Titan 2 SLA printer. 180 second exposures produces 1 inch squares of cured black, somewhat flexible material about 100 microns thick. The electrical conductivity was measured in the kilo-ohm range. Then, 1 inch squares are pyrolyzed in nitrogen at 1000° C. for 2 hours and allowed to cool. The resulting square electrodes are crack-free and have electrical conductivity in the 30-50 ohm range.

In yet another example, an anode was prepared according to the following method. A phenyl-vinyl hydrosiloxane is mixed with a platinum catalyst and formed into 1-10 micron spherical beads. For example, the catalyzed resin may be loaded into a high pressure syringe with a nozzle, and the syringe nozzle may be submerged in an emulsifying liquid such as water or glycol. In one example, the catalyzed resin is sprayed with pressure ranging from 10 to 1000 psi through a nozzle with orifice size ranging from 1 to 10 microns directly into an emulsifying liquid. The emulsifying liquid may be heated to the curing temperature of the resin, for example, which may range from 50 to 150 degrees centigrade, depending on catalyst. The size of spherical beads may be controlled by adjusting syringe nozzle size and spraying pressure. In one example, after the beads have cured, the beads are filtered out of the emulsifying liquid and dried.

For example, beads were cured at 130 degrees centigrade for two hours before pyrolysis in inert gas at 1000 degrees centigrade for 2 hours. In one example, the pyrolyzed beads are separated by ball milling for 10 hours in isopropanol. These separated beads were dried in an oven and mixed with a rapidly evaporating solvent. For example, the solvent may be an organic polar or nonpolar solvent. Some examples of suitable rapidly evaporating solvents are cyclohexane, acetone, ethanol, methanol, heptane, toluene and combinations of these.

The mixture comprising the beads was then mixed with phenolic resin at a 50/50 by mass mixture of a phenyl-vinyl siloxane and phenolic resin. The mixture was stored in a sealed jar for further processing. In one example, phenolic resin was dissolved in a fast evaporating solvent and was mixed with 15% by mass coal powder. This was stored in a sealed jar for further processing. A sheet of copy paper was cut into 1 inch wide by 3 inch long strips. To make the electrode, the paper was first dipped into the phenolic/coal resin up to 1.5 inches deep 3 times. The coated paper was allowed to dry, evaporating the solvent. Next, the coated paper was dipped into the bead/siloxane/phenolic mixture such that the coating covered 1 inch to 1.25 inches, and was removed to let the solvent dry for 1 minute. This step was repeated 2 more times to create a 200 micron thick electrode with about 100 microns of the bead/siloxane/phenolic coating each side of the electrode. Strips were hung in a convection oven and cured at 180° C. for 2 hours and subsequently pyrolyzed at 1000° C. for 4 hours in nitrogen. The resulting strips were composed of a highly porous siloxane/carbon matrix bonded to a dense, conductive glassy carbon conductor core.

In yet another example, a metal-doped glass-cermet electrode materials was created. For example, this material may be used as a cathode. For example, nickel, cobalt, and aluminum isopropoxides may be reacted with a silane-based PDC precursor utilizing a hydrolysis catalyst such as dibutyltin dilaurate. The molar ratio of the metals may be comparable to a similar standard NCA lithium ion battery cathode composition, for example. Once the materials are reacted, the liquid may be mixed with a small amount of titanium metal powder, such as 2 molar % of titanium metal powder, which functions as an additional reducing agent. For example, a polymer/aluminum mixture may be cured at 160° C. using a platinum catalyst and subsequently pyrolyzed in high purity argon at 1000° C. for 2 hours. The titanium powder functions as an oxygen getter absorbing residual oxygen in situ and controlling the oxidation state of the metals. After slow cooling, the resulting gray-black, hard ceramic-metallic material may be broken up into a coarse powder for further processing, such as ball milling and forming into an electrode.

This detailed description provides examples including features and elements of the claims for the purpose of enabling a person having ordinary skill in the art to make and use the inventions recited in the claims. However, these examples are not intended to limit the scope of the claims, directly. Instead, the examples provide features and elements of the claims that, having been disclosed in these descriptions, claims and drawings, may be altered and combined in ways that are known in the art.

What is claimed is:

1. An electrode of an energy storage device comprises:
a polymer derived ceramic coal dust composite electrode layer, wherein the polymer derived ceramic coal dust composite electrode layer is formed from a source of coal dust, the source of coal dust being coal dust, by mixing the source of coal dust with a silicon oxy carbide resin to form a mixture, the mixture being processed by pyrolysis causing a chemical reaction between the source of coal dust and the silicon oxy carbide resin, wherein the source of coal dust and the silicon oxy carbide resin is converted to a porous ceramic that is electrically conductive.

2. The electrode of claim 1, wherein the source of coal dust is heated to a temperature above ambient and less than 400 degrees centigrade during drying of the source of coal dust before mixing the source of coal dust with the silicon oxy carbide resin and forming the porous ceramic using pyrolysis.

3. The electrode of claim 1, wherein the electrical conductivity of the porous ceramic is better than the electrical conductivity of graphite having a similar porosity.

4. The electrode of claim 1, wherein the polymer derived ceramic coal dust composite electrode layer is fabricated using 50 wt % of the silicon oxy carbide resin.

5. The electrode of claim 1, wherein the polymer derived ceramic coal dust composite electrode layer is pyrolyzed in a non-oxidizing atmosphere at a temperature of at least 800 degrees centigrade.

6. The electrode of claim 5, wherein the source of carbon dust is processed at a temperature less than 200 degrees centigrade prior to forming the mixture of the source of coal dust with the silicon oxy carbide resin.

7. A lithium ion battery half-cell comprising the electrode of claim 1.

8. The electrode of claim 1, wherein the electrode maintains a specific capacity in milliamp hours per gram of greater than 800 for at least forty cycles.

9. The electrode of claim 1, wherein the silicon oxy carbide resin is selected from one or more of the following silicon oxy carbide resins: siloxanes, silanes, carbosilanes, silazanes, silsesquioxane and combinations thereof.

10. The electrode of claim 1, wherein the porosity of the porous ceramic is a nanoporous, open-celled ceramic network formed in situ during pyrolysis without any additional blowing agent being added to the mixture.

11. The electrode of claim 1, further comprising elementary metals or oxides of titanium, cobalt, manganese, aluminum or combinations thereof added to the mixture prior to pyrolysis of the mixture.

12. The electrode of claim 1, wherein the mixture further comprises nanotubes.

13. The electrode of claim 12, wherein the nanotubes are carbon nanotubes.

14. The electrode of claim 13, wherein the carbon nanotubes are multiwall carbon nanotubes.

15. A method of making the electrode of claim 1, the method comprising:
mixing a source of coal dust, the source of coal dust being coal dust, with a silicon oxy carbide resin to form a first mixture;
forming the first mixture into a layer; and
pyrolyzing the first mixture, wherein a chemical reaction between the source of coal dust and the silicon oxy carbide resin results in a porous ceramic that is electrically conductive.

16. The method of claim 15, further comprising a step of heating the source of coal dust to a temperature above ambient and less than 400 degrees centigrade before the step of mixing.

17. The method of claim 15, wherein the step of mixing further comprises adding carbon nanotubes.

18. The method of claim 16, further comprising a step of deagglomerating, wherein the carbon nanotubes are at least partially deagglomerated.

19. The method of claim 16, wherein the step of deagglomeration includes stirring and sonication.

20. The method of claim 16, wherein the carbon nanotubes are first added to a silicon oxy carbide resin to form a preliminary mixture, and further comprising:
pyrolyzing the preliminary mixture to form a solid;
milling the solid to form a powder;
adding the powder to a siloxane and a catalyst to form a second mixture;
pyrolyzing the second mixture to form a resultant; and
milling the resultant to form a powdered resultant, wherein the powdered resultant is added to the first mixture.

21. A method of making the electrode of claim 1, comprising:
mixing a siloxane with a platinum catalyst to form bead material;
forming the bead material into beads by emulsifying the bead material;
pyrolyzing the beads;
milling the beads to form milled beads;
mixing the milled beads with coal powder and a polymer derived ceramic precursor to form a composite mixture;
coating a substrate with the composite mixture to form a coated substrate;
pyrolyzing the coated substrate, wherein a porous, electrically-conductive ceramic is formed on a denser, electrically conductive core.

* * * * *